US010624051B2

(12) United States Patent
Roukos et al.

(10) Patent No.: US 10,624,051 B2
(45) Date of Patent: Apr. 14, 2020

(54) SYSTEM FOR MEASURING MULTI-PORT AMPLIFIER ERRORS

(71) Applicant: THE BOEING COMPANY, Chicago, IL (US)

(72) Inventors: Daniel S. Roukos, Chicago, IL (US); John A. Fleming, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 63 days.

(21) Appl. No.: 14/791,180

(22) Filed: Jul. 2, 2015

(65) Prior Publication Data
US 2017/0005894 A1 Jan. 5, 2017

(51) Int. Cl.
H04W 56/00 (2009.01)
H04W 24/08 (2009.01)
H04B 7/185 (2006.01)
H04L 12/26 (2006.01)

(52) U.S. Cl.
CPC ........ H04W 56/0035 (2013.01); H04B 7/185 (2013.01); H04L 43/0823 (2013.01); H04L 43/50 (2013.01); H04W 24/08 (2013.01)

(58) Field of Classification Search
None
See application file for complete search history.

(56) References Cited

U.S. PATENT DOCUMENTS

| 4,618,831 | A | 10/1986 | Egami et al. | |
|---|---|---|---|---|
| 5,736,963 | A * | 4/1998 | Roederer | H01Q 25/007 342/373 |
| 5,784,030 | A | 7/1998 | Lane et al. | |
| 6,006,111 | A * | 12/1999 | Rowland | H03F 3/602 330/124 R |
| 6,437,642 | B1 | 8/2002 | Rozario | |
| 7,088,173 | B1 * | 8/2006 | Rozario | H03F 1/02 330/124 R |
| 7,091,779 | B2 * | 8/2006 | Sahlman | H03F 1/3258 330/149 |
| 7,848,303 | B2 * | 12/2010 | Lindstrom | H04H 40/90 370/343 |
| 7,965,136 | B2 | 6/2011 | Rhodes et al. | |
| 8,004,356 | B2 | 8/2011 | Couchman | |
| 8,364,095 | B2 * | 1/2013 | van Zelm | H03F 1/3247 375/296 |

(Continued)

OTHER PUBLICATIONS

Alain Mallet, Aitziber Anakabe, Jacques Sombrin, Raquel Rodriguez, "Multiport-Amplifier-Based Architecture Versus Classical Architecture for Space Telecommunication Payloads", IEEE: Transactions on Microwave Theory and Techniques, vol. 54, No. 12, Dec. 2006, pp. 4353-4361.

(Continued)

Primary Examiner — Gregory B Sefcheck
(74) Attorney, Agent, or Firm — Moore Intellectual Property Law, PLLC

(57) ABSTRACT

Disclosed is a system for measuring multi-port amplifier errors ("SME") of a multi-port power amplifier ("MPA"), where the MPA has a plurality of input ports and a plurality of output ports. The SME may include at least one input coupler, an output array of couplers, an input switch network, an output switch network, and a combiner.

20 Claims, 5 Drawing Sheets

(56) References Cited

U.S. PATENT DOCUMENTS

| | | | |
|---|---|---|---|
| 8,451,172 B2* | 5/2013 | Angeletti | H01Q 3/40 |
| | | | 342/373 |
| 8,463,204 B2 | 6/2013 | Jones et al. | |
| 8,532,488 B2* | 9/2013 | Nielsen | H04B 3/50 |
| | | | 398/67 |
| 8,581,663 B2* | 11/2013 | Tronche | H03F 1/3247 |
| | | | 330/124 R |
| 8,604,975 B2* | 12/2013 | Saha | H04B 7/18515 |
| | | | 342/174 |
| 8,761,694 B2* | 6/2014 | Lorenz | H01Q 3/2605 |
| | | | 455/103 |
| 8,761,834 B2* | 6/2014 | Luz | H04B 7/0413 |
| | | | 455/101 |
| 9,413,306 B2* | 8/2016 | Moreau | H03F 3/211 |
| 10,084,538 B2* | 9/2018 | Nielsen | H04B 3/50 |
| 2017/0026006 A1* | 1/2017 | Roukos | H03F 1/42 |

OTHER PUBLICATIONS

Tanaka, et al., "Reconfigurable Multiport Amplifiers for In-Orbit Use" IEEE Transactions on Aerospace and Electronic Systems vol. 42, No. 1, Jan. 2006, 10 pgs.

* cited by examiner

SYSTEM FOR MEASURING MULTI-PORT AMPLIFIER ERRORS

BACKGROUND OF THE INVENTION

1. Field of the Invention

The present invention relates generally to satellite communication systems, and more generally to multi-port power amplifiers ("MPAs") utilized in satellite communication systems.

2. Related Art

In today's modern society satellite communication systems have become common place. There are now numerous types of communication satellites in various orbits around the Earth transmitting and receiving huge amounts of information. Telecommunication satellites are utilized for microwave radio relay and mobile applications, such as, for example, communications to ships, vehicles, airplanes, personal mobile terminals, Internet data communication, television, and radio broadcasting. As a further example, with regard to Internet data communications, there is also a growing demand for in-flight Wi-Fi® Internet connectivity on transcontinental and domestic flights. Unfortunately, because of these applications, there is an ever increasing need for the utilization of more communication satellites and the increase of bandwidth capacity of each of these communication satellites.

In FIG. 1, a system diagram of an example of an implementation of a known communication satellite 100 is shown orbiting the Earth 102. In this example, the communication satellite 100 is shown orbiting the Earth 102 at distance 104 of about 36,000 kilometers ("km") and illuminating part of the North American continent with a single beam 106 that results in a single satellite footprint 108 illuminating part of the North American continent. It is appreciated by of ordinary skill in the art that the type of orbit and distance 104 of the communication satellite 100 may vary based on the mission and/or function of the communication satellite 100. For example, the communication satellite 100 may be geostationary satellite that has an approximate constant distance 104 from the satellite footprint 108 (and a constant approximate 36,000 km distance from the equator of the Earth), a non-geostationary geosynchronous satellite that has an approximate constant distance 104 at a particular time each day, or a non-geosynchronous satellite (such as for example a low or medium Earth orbit satellite) that has a varying distance 104. Unfortunately, in this example the known communication satellite 100 is a single beam communication satellite with limited bandwidth capacity.

Known approaches to increase the bandwidth capacity utilize high level frequency re-use and/or spot beam technology which enables the frequency re-use across multiple narrowly focused spot beams. These known approaches typically involve the use of a multi-beam communication satellites systems instead of a signal beam communication satellite 100 as shown in FIG. 1.

Turning to FIG. 2, a system diagram of an example of an implementation of a known multi-beam communication satellite 200 is shown orbiting the Earth 102. Unlike the example in FIG. 1, in this example the multi-beam communication satellite 200 is shown illuminating parts of the North American continent with multiple beams 202, 204, and 206 that result in multiple satellite footprints 208, 210, and 212, respectively, illuminating parts of the North American continent. The multi-beam communication satellite 200 is also shown orbiting the Earth 102 at a distance 214 that may also vary (as in the example of FIG. 1) based on whether the multi-beam communication satellite 200 is a geostationary satellite that has an approximate constant distance 214 from the footprints 208, 210, and 212, a non-geostationary geosynchronous satellite that has an approximate constant distance 214 at a particular time each day, or a non-geosynchronous satellite that has a varying distance 214. The multi-beam communication satellite 200 covers the same approximate combined footprint area (i.e., footprints 208, 210, and 212 combined) as the single footprint 108 of the single beam communication satellite 100, shown in FIG. 1. However, in this example, the multi-beam communication satellite 200 is capable of obtaining higher antenna gains in each individual beam 202, 204, and 206 than the antenna gain of the single beam 106 of the signal beam communication satellite 100. This results in the multi-beam communication satellite 200 having an improved equivalent isotropically radiated power ("EIRP") and antenna gain-to-noise temperature ("G/T"), which results in improved bandwidth capacity.

Generally, these type of known multi-beam communication satellites 200 are effective for mobile communications or multi-media access networks because they have reduced transmitting power requirements and increased receiving power ability. However, these known systems do have a number of problems. As an example, their users may move from one geographic location to another and communication traffic may not be uniform among the multiple beams 202, 204, and 206 and may fluctuate over time. Moreover, generally these systems have insufficient beam 202, 204, and 206 isolation that may result in multi-path interference in the surrounding areas due to leakage through the adjacent beams 202, 204, and 206. As such, these types of multi-beam communication satellites 200 need a high power amplifier system that is capable of providing efficient transmitting power utilization with sufficient beam 202, 204, and 206 isolation.

At present, a well-known technique for providing this type of high power amplifier system is to utilize a multi-port power amplifier ("MPA"), also known as simply a "multi-port amplifier." An MPA is a system that includes a power divider, power combiner, and an array of high power amplifiers ("HPAs"). In general, an MPA has a number N of similar HPAs in parallel, each having a power P, so that each input signal is amplified equally by each HPA, to potentially increase the power of an output signal by a factor N, to a total power equal to P multiplied by N. The N input ports and N output ports are provided, so that an input signal on one input port is routed to the corresponding output port. In general, the N is equal to the total number of input ports and output ports and also equal to $2^n$, where n is an integer equal to or greater than 2.

More specifically, in FIG. 3, a block diagram of an example of an implementation of a known MPA 300 is shown. The MPA 300 may include an input network which is an input hybrid matrix ("IHM") 302, an output network which is an output hybrid matrix ("OHM") 304, a plurality of tuning mechanisms 306, 308, and 310, and a plurality of high power amplifiers ("HPAs") 312, 314, and 316. In this example, the IHM 302 includes input ports 318, 320, and 322 and the OHM 304 includes output ports 324, 326, and 328.

In this example, the IHM 302 is shown in signal communication with the tuning mechanisms 306, 308, and 310 via signal paths 330, 332, and 334, respectively. Similarly, The OHM 304 is shown in signal communication with the HPAs 312, 314, and 316 via signal paths 336, 338, and 340, respectively. The first tuning mechanism 306 is in signal communication with the first HPA 312 via signal path 342. Similarly, the second tuning mechanism 308 is in signal communication with the second HPA 314 via signal path 344. Moreover, the third tuning mechanism 310 is in signal communication with the third HPA 316 via signal path 346.

Further in this example, the IHM 302 is generally a power divider and the OHM 304 is generally a power combiner. As an example, the IHM 302 and OHM 304 may be two complementary N by N (i.e., N×N) Butler matrix networks that include a plurality of 90 degree hybrid networks (not shown). Additionally, each tuning mechanism 306, 308, and 310 is generally an equalizer and each HPA 312, 314, and 316 may be an amplifier unit such as, for example, a traveling wave tube amplifier ("TWTA") or solid state amplifier. Specifically, each equalizer may provide, as a minimum, adjustment of gain and phase response and may also provide a single gain and phase adjustment, or multiple adjustments based on the frequency and amplitude of the intermediate signals provided by the IHM 302.

It is appreciated by those of ordinary skill in the art that in this example while only three (3) tuning mechanisms 306, 308, and 310, three (3) HPAs 312, 314, and 316, three (3) input ports 318, 320, and 322, and three (3) output ports 324, 326, and 328 output ports are shown, this number is for convenience of illustration and it is appreciated that there may be N tuning mechanisms, HPAs, input ports, and output ports. In general, each combination of tuning mechanism and HPA may be considered a HPA chain (resulting in a plurality of HPA chains 348) because it is appreciated that while each tuning element 306, 308, and 310 is shown prior to each HPAs 312, 314, and 316, respectively, in FIG. 3, the order may be optionally reversed with the reversed HPA chain still be functionally equivalent.

In general, MPAs have numerous advantages over classical amplification architectures (i.e., with one power amplifier per beam) provided that the operating point is carefully chosen. The MPA 300 allows the discrete amplifiers (i.e., the HPA 312, 314, and 316) to be reconfigurable and can intrinsically handle unbalanced traffic among beams and traffic variations over time.

In an example, of operation, an input signal 350 may be injected into the first port 318 of the IHM 302 to produce an output signal 352 at the first output port 324. In any input signal injected into any of the input ports 318, 320, and 322 is divided into N intermediate signals 354, 356, and 358 that are passed to the tuning mechanisms 306, 308, and 310 and HPA 312, 314, and 316 chains. The N intermediate signals 354, 356, and 358 have particular phase relationships in that the first intermediate signal 352 may have a relative phase value of 0 degrees while the second intermediate signal 354 may have a relative phase value of 90 degrees.

As an example, if the IHM 302 is a 4 by 4 Bulter matrix, there would be four (4) output intermediate signals (i.e., a first intermediate signal 354, second intermediate signal 356, a third intermediate signal (not shown), and a fourth intermediate signal 358) with varying phase values. As an example, the first intermediate signal 354 may have a relative phase value of 0 degrees and the second intermediate signal 356 may have a relative phase value of 90 degrees. The third intermediate signal may have a relative phase value of negative 90 degrees and the fourth intermediate signal 358 may have a relative phase value of 180 degrees. If the OHM 304 is also a 4 by 4 Bulter matrix, the amplified and tuned intermediate signals would then be combined in a way that would result in first port 324 producing the output signal 352 that would be combination of all the tuned and amplified intermediate signals (i.e., the first intermediate signal 354, second intermediate signal 356, a third intermediate signal (not shown), and the fourth intermediate signal 358). The other output ports (i.e., second output port 326, third output port (not shown), and fourth output port 326) would not produce any output signals because they would be all phase cancelled out based on the respective phases of the four tuned and amplified intermediate signals.

Based on this, the advantage of utilizing an MPA is that it is an amplification architecture that provides intrinsic power flexibility since the power is shared between the channels (i.e., input ports 318, 320, and 322, the HPA chains 348, and output ports 324, 326, and 328). As such, the combined power of all the HPA chains 348 is available for any channel (i.e., output port 324, 326, and 328), provided that the other channels do not require power at the same time. This power flexibility is obtained without having to increase the power consumption.

Unfortunately, while very useful, MPAs have a number of inherent problems that affect their performance that resulting affects the performance of the multi-beam communication satellite 200. Specifically, while the MPA 300 generally provides a pool of power that may be variably distributed among its multiple ports (i.e., channels), a drawback is to MPAs is related to isolation losses between channels (i.e., the multiple ports 318, 320, and 322) due to different electrical characteristics of each path. Additionally, since all the inputs signals to the MPA 300 are amplified by each HPA 312, 314, and 316, multicarrier operation is reached even when a single carrier is introduced at each input port 318, 320, and 322.

Specifically, when the MPA 300 is free of errors, the various output signals 352, 360, and 362 exit the OHM 304 with complete isolation from each other; however, small errors anywhere within the MPA 300 may produce significant leakage of signals throughout the other (i.e., undesired) output ports. As an example, any errors in the MPA 300 may cause the desired output signal 352 to be leaked out of the other output ports 360 and 362 to produce a leakage of the output signal into the other ports 364.

As an example, some of these errors may be from the individual HPA 312, 314, and 316 that may introduce significant errors which will change over life, temperature and use of redundant or alternative units. The interconnecting transmission lines of signal paths 330, 332, 334, 336, 338, 340, 342, 344, and 346 and the imperfections in the tuning mechanisms 306, 308, and 310 may also contribute to the imbalance of the intermediate signals 354, 356, and 358 that may result in leakage throughout the MPA 300.

Known approaches for attempting to control MPA 300 alignment generally include two parts that include first providing mechanisms for tuning the MPA 300 adjustment and then determining the amount of adjustment to be made at each tuning mechanism 306, 308, and 310. Unfortunately, most of these known approaches require injecting special test signals into the MPA 300 input ports 318, 320, and 322 or at various interim locations internal (now shown) to the MPA 300, and then extracting the test signal from the output ports 324, 326, and 328. Often these approaches consume an output port 324, 326, and 328 of the MPA 300 for calibration purposes and the adjustments are often performed by trial-and-error, or by ad-hoc methods to minimize the leakage. Moreover, these approaches generally require extensive spacecraft hardware for making accurate measurements on the spacecraft and challenges still exist in directly measuring the phase and amplitude accurately from the ground.

As such, there is a need for a system and method for making accurate phase and amplitude error measurements in spacecraft MPA with a minimum amount of spacecraft hardware.

SUMMARY

Disclosed is a system for measuring multi-port amplifier errors ("SME") of a multi-port power amplifier ("MPA"), where the MPA has a plurality of input ports and a plurality of output ports. The SME may include at least one input coupler, an output array of couplers, an input switch network, an output switch network, and a combiner. The at least one input coupler is in signal communication with at least a one input port of the plurality of input ports of the MPA. The output array of couplers includes a plurality of output couplers and the plurality of output couplers are in signal communication with the plurality of output ports of the MPA. The input switch network is in signal communication with the at least one input coupler and the input switch network is configured to receive a test signal and, in response, inject the test signal into the at least one input coupler. The output switch network is in signal communication with the plurality of output couplers of the output array of couplers. Furthermore, the combiner is in signal communication with the output switch network and is configured to receive a reference signal and to combine the reference signal with a processed test signal to produce a combined test and reference signal. The processed test signal is a signal created as a result of passing the test signal through the input switch network, at least one input coupler, MPA, and output switch network and the test signal and reference signal are coherent generated signals.

In general, the MPA has a plurality of input ports, a plurality of high power amplifier ("HPA") chains, and a plurality of output ports. In an example of operation, the SME performs a process for adjusting at least one HPA chain of the MPA. The process may include receiving a coherently generated reference signal and test signal. The process then routes the test signal to at least one input port of a plurality of input ports of the MPA and then receives a plurality of output test signals from a plurality of output ports of the MPA. The process then routes a processed test signal to a combiner and the combiner combines the processed test signal with the reference signal to produce a combined test and reference signal. The process then determines a difference between the processed test signal and reference signal from the combined test and reference signal.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 2:
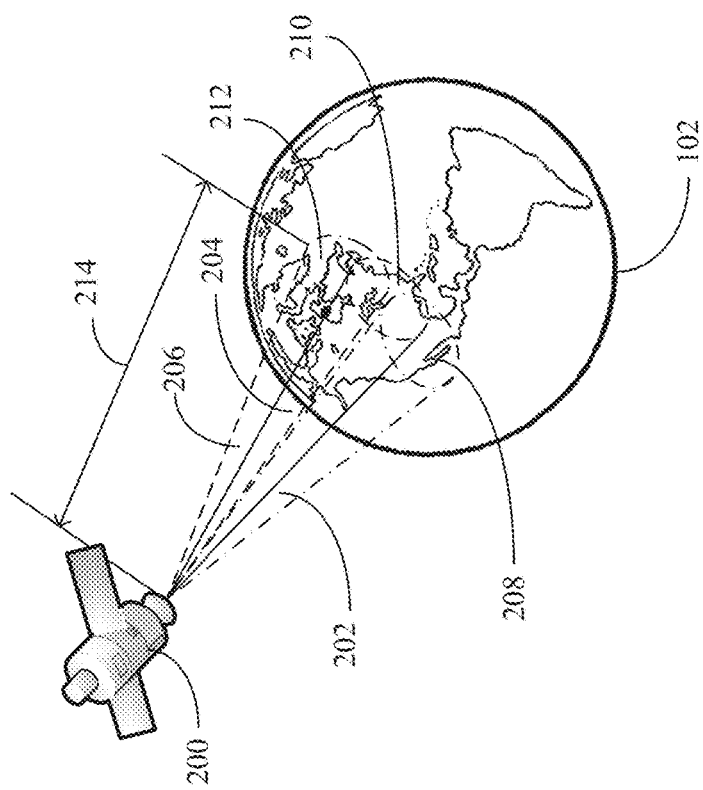
FIG. 2 is a system diagram of an example of an implementation of a known multi-beam communication satellite orbiting the Earth.
Figure 1:
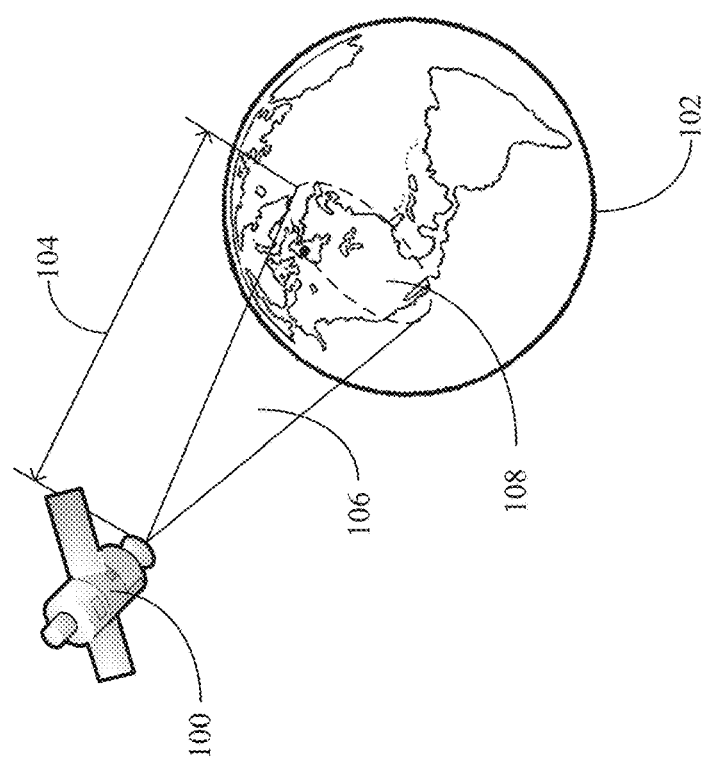
FIG. 1 is a system diagram of an example of an implementation of a known communication satellite orbiting the Earth.

Disclosed is a system for measuring multi-port amplifier errors ("SME") of a multi-port power amplifier ("MPA"), where the MPA has a plurality of input ports and a plurality of output ports. The SME may include at least one input coupler, an output array of couplers, an input switch network, an output switch network, and a combiner. The at least one input coupler is in signal communication with at least a one input port of the plurality of input ports of the MPA. The output array of couplers includes a plurality of output couplers and the plurality of output couplers are in signal communication with the plurality of output ports of the MPA. The input switch network is in signal communication with the at least one input coupler and the input switch network is configured to receive a test signal and, in response, inject the test signal into the at least one input coupler. The output switch network is in signal communication with the plurality of output couplers of the output array of couplers. Furthermore, the combiner is in signal communication with the output switch network and is configured to receive a reference signal and to combine the reference signal with a processed test signal to produce a combined test and reference signal. The processed test signal is a signal created as a result of passing the test signal through the input switch network, at least one input coupler, MPA, and output switch network and the test signal and reference signal are coherent generated signals.

In general, the MPA has a plurality of input ports, a plurality of high power amplifier ("HPA") chains, and a plurality of output ports. In an example of operation, the SME performs a process for adjusting at least one HPA chain of the MPA. The process may include receiving a coherently generated reference signal and test signal. The process then routes the test signal to at least one input port of a plurality of input ports of the MPA and then receives a plurality of output test signals from a plurality of output ports of the MPA. The process then routes a processed test signal to a combiner and the combiner combines the processed test signal with the reference signal to produce a combined test and reference signal. The process then determines a difference between the processed test signal and reference signal from the combined test and reference signal.

It is appreciated by those skilled in the art that the circuits, components, modules, and/or devices of, or associated with, the SME are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Figure 4:
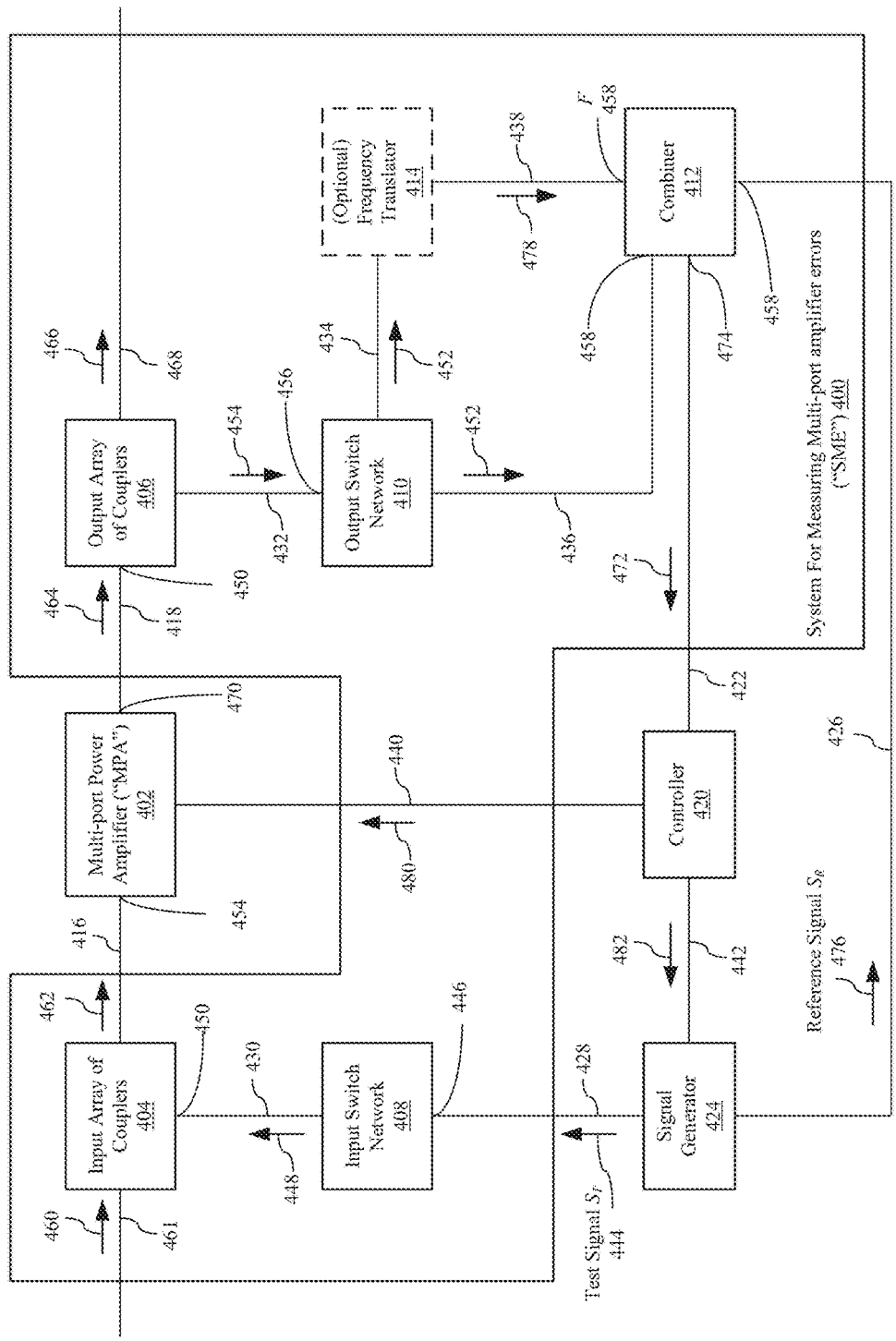
FIG. 4 is a block diagram of an example of an implementation of a system for measuring multi-port amplifier errors ("SME") in accordance with the present invention.

More specifically, in FIG. 4, a block diagram of an example of an implementation of a system for measuring multi-port amplifier errors ("SME") 400 is shown in accordance with the present invention. The SME 400 is configured to measure the errors of a multi-port power amplifier ("MPA") 402. The SME 400 may include an input array of couplers 404, output array of couplers 406, input switch network 408, output switch network 410, and combiner 412. The SME 400 may also include an optional frequency translator 414.

In this example, the SME 400 is in signal communication with the MPA 402, via signal paths 416 and 418 and in signal communication with a controller 420 via signal path 422. Moreover, the SME 400 may be in signal communication with a signal generator 424 via signal paths 426 and 428. The SME 400 optionally may be also in signal communication with a frequency source (not shown) that is also in signal communication with the signal generator 424.

Furthermore, in this example within the SME 400, the input array of couplers 404 is in signal communication with MPA 402 and input switch network 408 via signal paths 416 and 430, respectively. The output array of couplers 406 is in signal communication with MPA 402 and output switch network 410 via signal paths 418 and 432, respectively. The output switch network 410 is in signal communication with the optional frequency translator 414 or combiner 412 (if no frequency translator 414 present) via signal paths 434 or 436. If there is a frequency translator 414, the frequency translator 414 is in signal communication with the output switch network 410 and combiner via signal paths 434 and 438, respectively. The controller 420 is in signal communication with the combiner 412, MPA 402, and signal generator 424 via signal paths 422, 440, and 442, respectively.

In this example, the input switch network 408 may be a circuit, device, component, or module that generally is a switch matrix that is configured to route and/or cycle an input signal to multiple outputs. The input switch network 408 may be hardware based, software based, or both. As an example, it may include subcomponents such as switches, couplers, mixers, amplifiers, attenuators, and splitters. In general, the input switch network 408 is configured to receive an input signal 444 from the signal generator 424, via signal path 428, at the input 446 of the input switch network 408 and, in response, sequentially inject the input signal 448 into an input 450 of the input array of couplers 404 via signal path 430.

Similarly, the output switch network 410 may be also a circuit, device, component, or module that generally is a switch matrix that is configured to route and/or cycle multiple outputs from the output array of couplers 406 to a single output signal 452. The output switch network 410 may be also hardware based, software based, or both and may include subcomponents such as switches, couplers, mixers, amplifiers, attenuators, and splitters. In general, the output switch network 410 is configured to receive a plurality of output signals 454 from the output array of couplers 406, via signal path 432, at the input 456 of the output switch network 410 and, in response, sequentially produce the output signal 452 that is passed into input 458 of the combiner 412 via signal path 436. If the optional frequency translator 414 is present, the output signal 452 is passed instead to the frequency translator 414 via signal path 434.

In this example, the input array of couplers 404 includes a set of a plurality of couplers (not shown) that are configured to allow input signals 460 (from signal path 461 from other external devices (not shown)) to the MPA 402 to pass through the individual couplers (not shown) of the plurality of couplers of the input array of couplers 404 to the plurality of inputs (not shown) of the MPA 402. The individual couplers of the input array of couplers 404 are also configured to pass the input signal 448 that is sequentially injected into the input array of couplers 404 to a corresponding input port (not shown) of the MPA 402. The resulting signal, or signals, 462 are then injected into the input 464 of the MPA 402.

Similarly, the output array of couplers 406 includes a set of a plurality of couplers (not shown) that are configured to allow an output signal, or signals, 464 from the MPA 402 to pass through the individual couplers (not shown) of the plurality of couplers of the output array of couplers 406 to produce a system output signal 466 that may be passed to external devices (such as, for example, multiple antennas) from the SME 400 via signal path 468. The individual couplers of the output array of couplers 406 are also configured to receive the output signal, or signals, 464 from the plurality of output ports 470 and pass the coupled signals 454 to the output switch network 410 via signal path 432.

In this example, the individual couplers of both the input array of couplers 404 and output array of couplers 406 may be passive or active couplers. Examples of passive couplers include coax, waveguide, micro-strip, and strip-line directional couplers or coupled-line couplers. Examples of active couplers may be solid-state couplers.

The combiner 412 may be any type of summation circuit, device, component, or module that is configured to receive two input signals and combine them into a combined output signal 472 that is passed from the output port 474 to the controller 420 via signal path 422. The combiner 412 may be an active or passive device. In this example, if the optional frequency translator 414 is not present, the combiner 412 is configured to receive the output signal 452 from the output switch network 410 (via signal path 436) and a reference input signal $S_R$ 476 from the signal generator 424 (via signal path 426) and, in response, combine them to produce the combined output plus reference signal 472 that is passed to the controller 420. If, instead, the optional frequency translator 414 is present, the combiner 412 is configured to receive the output signal 478 from the optional frequency translator 414 (via signal path 438) and the reference input signal $S_R$ 476 and, in response, combine them to them to produce the combined output plus reference signal 472 that is passed to the controller 420.

The signal generator 424 may be any type of electronic circuit, device, component, or module that is configured to produce repeating or non-repeating analog or digital signals. The signal generator 424 may include a frequency source (not shown) either within the signal generator or in signal communication with the signal generator, where the frequency source is capable of producing a stable reference signal waveform. An example of a frequency source would include an oscillator. In this example, the signal generator 424 is configured to produce the test signal $S_T$ 444 and reference signal $S_R$ 476 as two coherent signals. The reference signal $S_R$ 476 may also be referred to as a calibration tone. Additionally, the combiner 412 may optionally receive clock information (i.e., a clock signal) from the frequency source (not shown) so as to coherently combine the reference signal $S_R$ 476 to produce the combined output plus reference signal 472. It is appreciated by those of ordinary skill in the art that the reference signal $S_R$ 476 and test signal $S_T$ 444 may each be a type of signal selected from the group consisting of a tone signal, modulated tone signal, pseudo-random noise code ("$P_n$") signal, Walsh code signal, and other type of orthogonal spreading code digital signal.

In this example, it is appreciated by those of ordinary skill in the art that the entire SME 400 may be located within the same flight vehicle (such as, for example, a satellite in orbit) or part of the SME 400 may be located in the flight vehicle while another part of the SME 400 may be located at a ground station in signal communication with the flight vehicle but remote from the flight vehicle. As an example, the combiner 420 may be located within the SME 400, external to the SME 400 but located within the same flight vehicle, or at a ground station (not shown) in signal communication with the output switch network 410 located on the flight vehicle.

The controller 420 may be a capture device that captures the combined output plus reference signals 472 as the input switch network 408 cycles (i.e., selects) through which individual couplers (of the input array of couplers 404) have been injected with the input signal 448 produced by the input switch network 408 cycling the test signal $S_T$ 444. The controller 420 is configured to determine the differences between the resulting output signal (i.e., output signal 452 or output signal 478) that was produced by the entire system and injected into the input port 458 of the combiner 412 and the reference signal $S_R$ 476. These differences are utilized by the controller 420 to determine any errors introduced by the MPA 402 on the test signal $S_T$ 444 as it is processed by the MPA 402. In response, the controller 420 may send correction signals 480 to the MPA 402 via signal path 440. Moreover, the controller 420 may also send control signals 482 to the signal generator 424, via signal path 442, to adjust the frequency of the test signal $S_T$ 444 so as to test the MPA 402 across different frequencies within the bandwidth of operation of the MPA 402. In general, the controller 420 may include sub-components such as, for example, a signal measurement module (not shown), calculation module (not shown), analog-to-digital converters ("A/D"), digital-to-analog converters ("D/A"), processor (not shown), memory (not shown), software (not shown), etc. The controller 420 may include both hardware and software and may be implemented utilizing a microprocessor, microcontroller, digital signal processing ("DSP"), application specific integrated circuit ("ASIC"), or other similar type devices. Similar to the controller 420, the controller 420 may also be located within the SME 400, external to the SME 400 but located within the same flight vehicle, or at a ground station (not shown) in signal communication with the SME 400 on the flight vehicle.

As an example of an implementation of SME 400 utilizing elements located at a ground station (such as, for example, an ground operations center), the flight vehicle (not shown) may also include an antenna (not shown) for transmitting the reference signal $S_R$ 476 to the ground station via the signal path 476 that is independent from another antenna (not shown) transmission path of the output signal 452 from the MPA 402 and output switch network 410 to the ground station via signal path 436. In this example, the combiner 412 (located at the ground station) is configured to combine the received reference signal $S_R$ 476 and the output signal 452 to produce the combined signal 472 that is passed to the controller 420 (also located at the ground station) via signal path 422. In this example, the signal path 422 may include amplifiers, A/D, D/A, and other processing elements. The controller 420 may include processors, DSP, and other elements configured to produce calibration commands in response to analyzing the combined signal 472. The calibration commands may then be transmitted to a telemetry and command ("T&C") system (not shown) located on the flight vehicle and in signal communication with the SME 400, MPA 402, and signal generator 424. In this example, the T&C system may be a part of the signal path 440 and 442.

The frequency translator 414 is generally a circuit, device, component, or module that is configured to produce a frequency shift in the output signal 452 from the output switch network 410 via signal path 436. As an example, the frequency translator 414 may include a mixer (not shown) or modulator (not shown) that that changes the frequency of the output signal 452, from the output switch network 410, to the new output signal 478 to the combiner 412.

Figure 5:
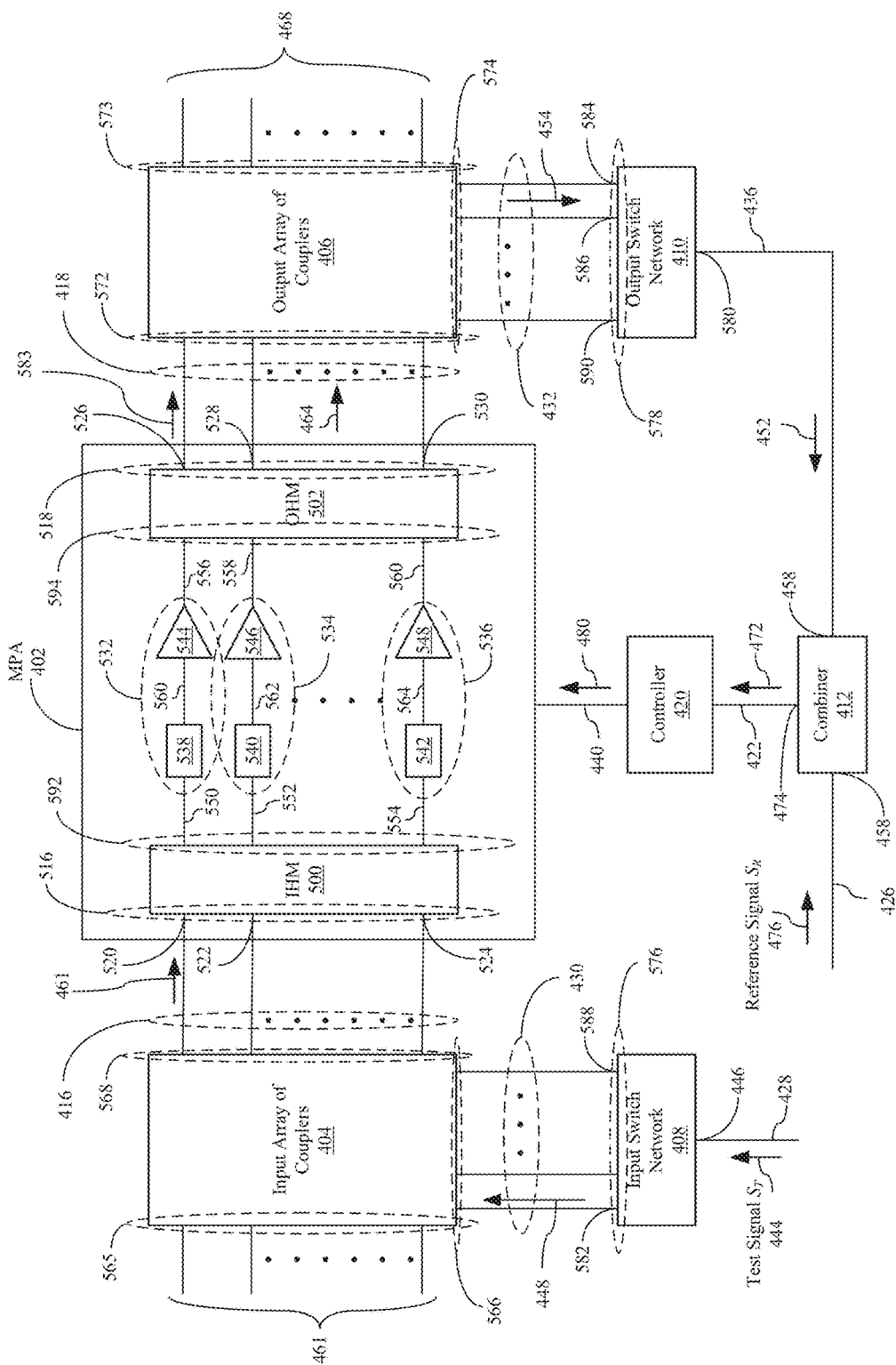
FIG. 5 is another block diagram of the SME (shown in FIG. 4) in accordance with the present invention.

Turning to FIG. 5, another block diagram of the SME 400 is shown in accordance with the present invention. In FIG. 5, the MPA 402, input array of couplers 404, output array of couplers 406, input switch network 408, and output switch network 410 are shown with greater detail than in FIG. 4.

Figure 3:
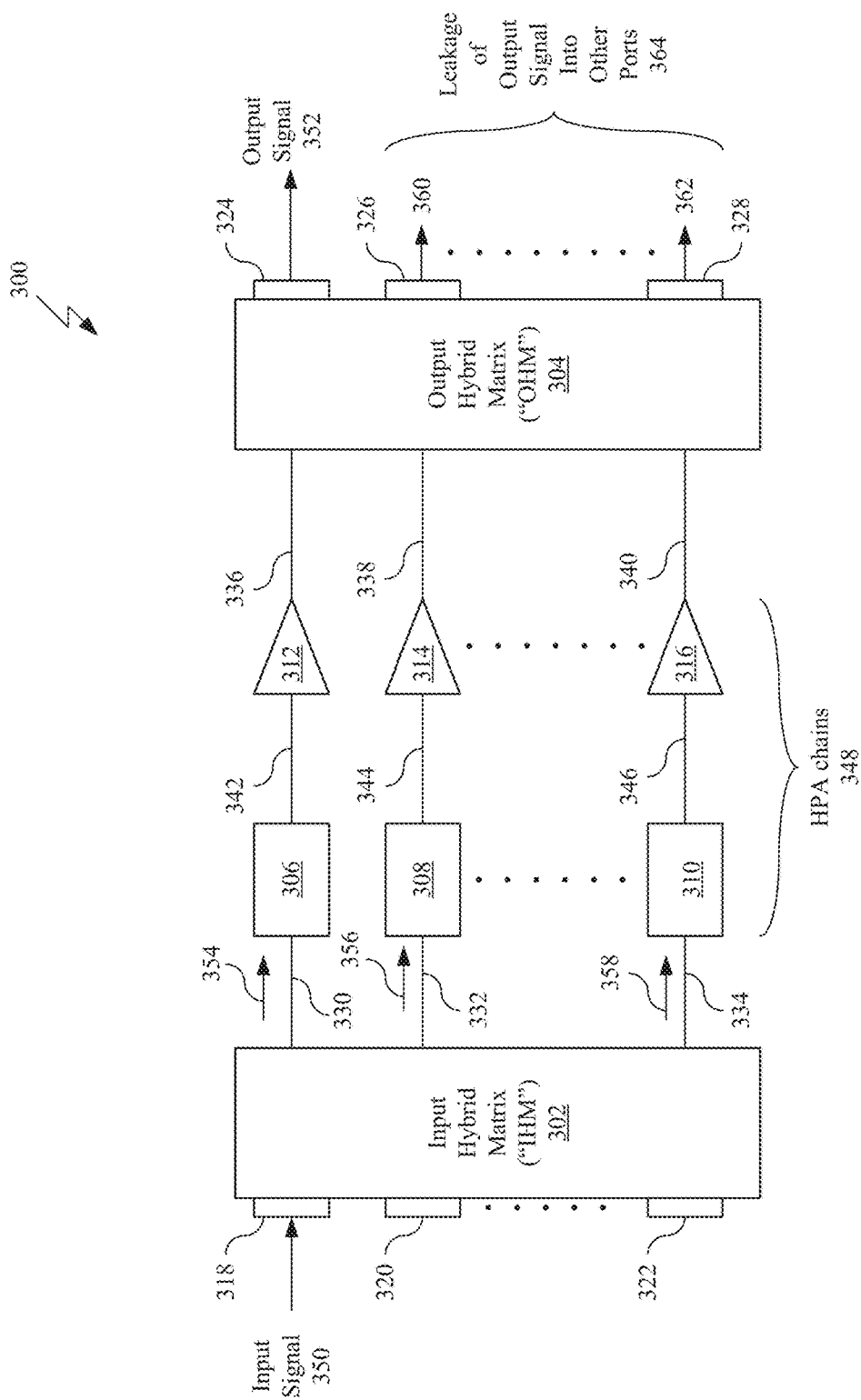
FIG. 3 is a block diagram of an example of an implementation of a known multi-port power amplifier ("MPA") for use in a multi-beam communication satellite shown in FIG. 2.

Specifically, the MPA 402 is similar to the MPA 300 (shown in FIG. 3). Similar to the MPA 300 (shown in FIG. 3), the MPA 402 may include an input hybrid matrix ("IHM") 500, an output hybrid matrix ("OHM") 502, a plurality of tuning mechanisms 504, 506, and 508, and a plurality of high power amplifiers ("HPAs") 510, 512, and 514. In this example, the MPA 402 is shown to be an N by N (i.e., N×N) MPA 402 having N input ports 516 and N output ports 518. More specifically, the IHM 500 includes input ports 520, 522, and 524 and the OHM 502 includes output ports 526, 528, and 530. It is appreciated by those of ordinary skill in the art that in this example while only three (3) IHM 500 input ports 520, 522, and 524 and three OHM 502 output ports 526, 528, and 530 are shown, this number is for convenience of illustration and it is appreciated that there may be N input ports and N output ports, where N is equal to $2^n$ and n is an integer equal to or greater than 1.

The MPA 402 may also include a plurality of N high-power amplifier chains ("HPA chains") 532, 534, and 536 that each include a tuning mechanism 538, 540, and 542 and a high-power amplifier ("HPA") 544, 546, and 548, respectively. Again, for convenience of illustration, only three (3) HPA chains 532, 534, and 536 (with corresponding tuning mechanisms 538, 540, and 542 and HPAs 544, 546, and 548) have been shown but it is appreciated that there are N of each.

In this example, the IHM 500 is shown in signal communication with the tuning mechanisms 538, 540, and 542 via signal paths 550, 552, and 554, respectively. Similarly, The OHM 502 is shown in signal communication with the HPAs 544, 546, and 548 via signal paths 556, 558, and 560, respectively. The first tuning mechanism 538 is in signal communication with the first HPA 544 via signal path 560. Similarly, the second tuning mechanism 540 is in signal communication with the second HPA 546 via signal path 562. Moreover, the third tuning mechanism 542 is in signal communication with the third HPA 548 via signal path 564.

Furthermore in this example, the IHM 500 is generally a power divider and the OHM 502 is generally a power combiner. As discussed earlier, the IHM 500 and OHM 502 may be two complementary N by N Butler matrix networks that include a plurality of 90 degree hybrid networks (not shown). Additionally, each tuning mechanism 538, 540, and 542 is generally an equalizer and each HPA 544, 546, and 548 may be an amplifier unit such as, for example, a traveling wave tube amplifier ("TWTA") or solid state amplifier. Specifically, each equalizer may provide, as a minimum, adjustment of gain and phase response and may also provide a single gain and phase adjustment, or multiple adjustments based on the frequency and amplitude of the intermediate signals provided by the IHM 500 along signal paths 550, 552, and 554.

In general, each combination of tuning mechanism and HPA may be considered a HPA chain (resulting in a plurality of HPA chains 542, 534, and 536); however, it is appreciated that while each tuning element 538, 540, and 542 is shown prior to each HPAs 544, 546, and 548, respectively, the order may be optionally reversed with each tuning element 538, 540, and 542 shown after each HPAs 544, 546, and 548. In this alternative arrangement, the HPA chains 532, 534, and 536 are still functionally equivalent.

Likewise, the input array of couplers 404 is shown to have two sets of N input ports (565 and 566) and N output ports 568. Similarly, the output array of couplers 406 is shown to have N input ports 572 and two sets of N output ports 573 and 574. Furthermore, the input switch network 408 is shown to have one input port 446 and N output ports 576 and the output switch network 410 is shown to have N input ports 578 and one output port 580. Again, in this example, N represents the total number of ports for each device described in FIG. 5, which is equal the total number of input ports 516 of the MPA 402 since the SME 400 is designed to inject and measure signals from the MPA 402.

In this example, each component in the SME 400 and MPA 402 has a complex gain associated with it that may be utilized to characterize the transfer characteristics of the test signal $S_T$ 444 as it passes through a signal path that includes the input switch network 408, input array of couplers 404, MPA 402, output array of couplers 406, output switch network 410, and combiner 412 similar to a transfer function for that path. Specifically, if it is assumed that the input switch network 408 has a complex gain equal to A, the input array of couplers 404 has a complex gain equal to B, the IHM 500 has a complex gain equal to C, the HPA chains 532, 534, and 536 have complex gain equal to D, the OHM 500 has a complex gain equal to E, the output array of couplers 406 has a complex gain equal to F, the output switch network 410 has a complex gain equal to G, and the combiner 412 has a complex gain equal to H, the total complex gain of the path of the test signal $S_T$ 444 as injected into the input port 446 of the input switch network 408 and observed at the output port 474 of the combiner 412 as part of the combined output signal 472.

In an example of operation utilizing the respective complex gains of the different components, the test signal $S_T$ 444 is injected into the input port 446 of the input switch network 408 via signal path 428. Assuming that the MPA 402 is an N×N MPA 402. The input switch network 408 routes and/or cycles the injected test signal $S_T$ 444 to one of the N output ports 576 of the input switch network 408 that are passed to the input array of couplers 404 via signal path 430. As an example, if the input switch network 408 routes the injected test signal $S_T$ 444 to the first output port 582 of input switch network 408 which processes the injected test signal $S_T$ 444 with complex gain A before passing the input signal 448 to the input array of couplers 404 via signal path 430. The input array of couplers 404 then process the input signal 448 with complex gain $B_1$ before passing the coupled signal 462 to the first input port 520 of the IHM 500. The coupled signal 462 is then processed by the IHM 500 and divided into sub-signals that are passed to the N HPA chains 532, 534, and 536 which pass the sub-signals to the N input ports of the OHM 502. The OHM 502 then combines these sub-signals into at least one output signal 464 (from one of the N output ports 518 of the OHM 502) that is passed to the N input ports 572 of the output array of couplers 406. If the MPA 402 is properly matched, there will only be one output signal 583 for the first output port 526 of the MPA 402 because all the output ports 518 will be approximately fully isolated; however, in practice any imperfections in the MPA 402, and more specifically, within the elements of the any of the HPA chains 532, 534, and 536 will cause the output ports 518 to not be fully isolated such that that leakage signals 464 will be output for the other output ports 518 of the MPA 402. As such, the N output signals 464 from the OHM 502 are injected into the N input ports 572 of the output array of couplers 406, which couples the signals to form the N coupled output signals 454 that are passed to the N input ports 578 of the output switch network 410. The output switch network 410 then selects one of the N coupled output signals 454 (for example, the coupled signal received at the first input port 584 of the output switch network 410) and passes it as the selected output signal 452 that is output from the output port 580 of the output switch network 410 and injected into the combiner 412. Since process of signal communication of the test signal $S_T$ 444 includes traveling through a signal path that starts at the input port 446 of the input switch network 408 and ends at the input port 458 of the combiner 412 while traveling through multiple N port devices, the complex gain of this path (from the first output port 582 to the combiner 412) may be described as a summation of the N signal components along the path. However, for every individual input signal 448 that is sent to the input array of couplers 404 from input switch network 408, there will be a total of N coupled output signals 454 received at the output switch network 410, which will require N total summations to obtain the complex gain for the first input signal 448 output from the first output port 582 of the input switch network 408. As such, if all N input signals 448 from all the N output ports 576 of the input switch network 408 are injected into the input array of couplers 404, the total required summation to obtain the complex gain for all the input signals 448 output from the first output port 582 of the input switch network 408 would be $N^2$ summations. However, the disclosed approach only needs N summations as discussed below.

Based on this approach, the complex gain for the first signal output form the first output port 582 of the input switch network 408 and selected at the first input port 584 of the output switch network 410 may then be described as $$g_1 = AB_1G_1H = \sum_{i=1}^{N}(AB_1C_1D_i)(D_iE_i)(E_iF_1G_1H).$$

Similarly, the complex gain for the first signal output form the first output port 582 of the input switch network 408 and selected at the second input port 586 of the output switch network 410 may then be described as $$g_2 = AB_1G_2H = \sum_{i=1}^{N}(AB_1C_1D_i)(D_iE_i)(E_iF_2G_2H).$$

Moreover, the complex gain for the $N^2$ signal output form the $N^{th}$ output port 588 of the input switch network 408 and selected at the $N^{th}$ input port 590 of the output switch network 410 may then be described as $$g_{N^2} = AB_NG_NH = \sum_{i=1}^{N}(AB_NC_ND_i)(D_iE_i)(E_iF_NG_NH).$$

From these relationships it is appreciated that the $AB_1G_1H$ corresponds to the complex gain of the path from input port 446 (through the output port 582) of the input switch network 408 as observed at the input port 458 of the combiner 412 when the first input port 584 is selected in the output switch network 410. However, the relationship $AB_1C_1D_i$ represents the complex gain of a single path in the IHM 500 from the input port 446 (through the output port 582) of the input switch network 408 to the plurality of outputs 592 of the IHM 500. Additionally, the relationship $E_iF_1G_1H$ represents the complex gain of multiple paths in the OHM 502 from the plurality of inputs 594 of the OHM 502, through the output array of couplers 406 and plurality of input ports 578 of the output switch network 410 to the single output signal 454 selected at the first input port 584 of the output switch network 410 that is output from the output port 580 (of the output switch network 410) to the input port 458 of the combiner 412.

Because of the type of components utilized in the input switch network 408, input array of couplers 404, IHM 500, OHM 502, output array of couplers 406, output switch network 410, and combiner 412, these components in combination described by the relationships defined by $AB_iC_iD_i$ and $E_iF_iG_iH$ represent switch matrices that are generally considered electronically stable. As such, the paths through these components may be characterized by radio frequency ("RF") testing at the beginning of their life (i.e., when being fabricated).

The relationship $D_iE_i$, however, represents the complex gain of the $i^{th}$ HPA chain 532, 534, or 536. Generally, the N HPA chains 532, 534, or 536 have components that will drift over time and need to be adjusted so as to not degrade the performance of the MPA 402. As such, if $AB_iC_iD_i$ and $E_iF_iG_iH$ represent stable relationships, the present process solves for relationship of $D_iE_i$ which is not stable and will produce errors that will need to be corrected.

Utilizing a matrices approach to the summation relationships described earlier, the values of $AB_iC_iD_i$ and $E_iF_iG_iH$ may be represented by elements of an M-matrix described as [M] shown as $$[M] = \begin{bmatrix} a_{1,1} & a_{1,2} & \cdots & a_{1,N} \\ a_{2,1} & a_{2,2} & & a_{2,N} \\ \vdots & & \ddots & \vdots \\ a_{N,1} & a_{N,2} & \cdots & a_{N,N} \end{bmatrix}.$$

The elements of the M-matrix are described as:
$a_{1,1}=(AB_1C_1D_1)(E_1F_1G_1H)$, $a_{1,2}=(AB_1C_1D_2)(E_2F_1G_1H)$, and $a_{1,N}=(AB_1C_1D_N)(E_NF_1G_1H)$;
$a_{2,1}=(AB_1C_1D_1)(E_1F_2G_2H)$, $a_{2,2}=(AB_1C_1D_2)(E_2F_2G_2H)$, and $a_{2,N}=(AB_1C_1D_N)(E_NF_2G_2H)$; and
$a_{N,1}=(AB_NC_ND_1)(E_1F_NG_NH)$, $a_{N,2}=(AB_NC_ND_2)(E_2F_NG_NH)$, and $a_{N,N}=(AB_NC_ND_N)(E_NF_NG_NH)$.

Generally, the relationship $D_iE_i$ may also be represented by elements of an DE-matrix described as [DE] shown as $$[DE] = \begin{bmatrix} D_1E_1 \\ D_2E_2 \\ \vdots \\ D_NE_N \end{bmatrix}.$$

Furthermore, the relationship $g_j$ (where j is an integer from 1 to $N^2$) for the complex gain (per path) may also be represented by elements of an g-matrix described as [g] shown as $$[g] = \begin{bmatrix} g_1 \\ g_2 \\ \vdots \\ g_N \end{bmatrix}.$$

As such, utilizing matrices, the plurality of summations for complex gain per path may be described as [g]=[M][DE]. Since [DE] is the desired relationship that needs to be solved to determine if there are any errors in the HPA chains 532, 534, or 536, the [M] may be inverted such that the solution for [DE] is $[DE]=[M]^{-1}[g]$.

From this relationship, it is appreciated that only N equations are needed to solve for [DE], while $N^2$ equations are available. As such, only a single input signal 448 generated from the test signal $S_T$ 444 (by the input switch network 408) is needed to solve for [DE]. Therefore, this approach allows determining [DE] only utilizing leakage signal measurements from the plurality of output ports 518 of the OHM 502.

In this example, [DE] by accurately measuring the difference between reference signal $S_R$ 476 and test signal $S_T$ 444 as they are received by the SME 400. In general, the complex gain of the system alters the input test signal $S_T$ 444 such that the resulting processed test signals $[S_{T\text{-}processed}]$ 452 have the following relationship $[S_{T\text{-}processed}]=S_T[g]=S_T[M][DE]$.

Because the SME 400 only measures the reference signal $S_R$ 476 and a processed version $[S_{T\text{-}processed}]$ 452 of the test signal $S_T$ 444 (i.e., output signal 452 from the output switch network 410), process does not use the test signal $S_T$ 444 directly in determining [DE]. Since the reference signal $S_R$ 476 and test signal $S_T$ 444 were coherently generated, they are related to each other in that one signal is generally the response of a linear system to the other applied signal. As such, if a predetermined fixed or settable level difference a (also known as a "level offset" between reference signal $S_R$ 476 and test signal $S_T$ 444) is set between the reference signal $S_R$ 476 and test signal $S_T$ 444 when they were created, the relationship between the reference signal $S_R$ 476 and test signal $S_T$ 444 may be described as $S_T=\alpha S_R$. Therefore, $[S_{T\text{-}processed}]=\alpha S_R[g]=\alpha S_R[M][DE]$. From this relationship, DE may be described as $$[DE] = [M]^{-1} \frac{[S_{T-processed}]}{\propto S_R}.$$

In this example, the level offset a between the reference signal $S_R$ 476 and test signal $S_T$ 444 may be utilized to manage the dynamic range of the SME 400 so to improve the measurement of both reference signal $S_R$ 476 and test signal $S_T$ 444 simultaneously.

As a result of this new relationship, the SME 400 (or controller 420) only needs to determine the difference $[\delta_{TR}]$ from the two measurements of the reference signal $S_R$ 476 and $[S_{T-processed}]$ 452 because $$[\delta_{TR}] = \frac{[S_{T-processed}]}{\propto S_R} = [M][DE].$$

As such, $[DE]=[M]^{-1}[\delta_{TR}]$. It is appreciated that the comparison of the processed test signals $[S_{T-processed}]$ 452 and the reference signal $S_R$ 476 may accomplished in many ways that include utilizing digitization and post-processing on board the vehicle in which the SME 400 is located or on the ground. The comparative function of the comparator 412 may be done, for example, utilizing a miniature microwave integrated circuit or via software.

In certain implementation, both the processed test signals $[S_{T-processed}]$ 452 and the reference signal $S_R$ 476 may have common-mode frequency and amplitude variations. If so, the amplitude variations may be compensated directly by determining $[\delta_{TR}]$. Any frequency variations of the reference signal $S_R$ 476 may due to Doppler effects and frequency drift may be measured and utilized to compensated for induced phase drift between the reference signal $S_R$ 476 and processed test signals $[S_{T-processed}]$ 452.

Turning back to FIG. 4, in the optional frequency translator 414 is included in the SME 400, the frequency translator 414 is configured to frequency translate the processed test signals $[S_{T-processed}]$ 452 before it is combined (i.e., summation) with the reference signal $S_R$ 476. The purpose for this translation is that the reference signal $S_R$ 476 must generally occupy a vacant channel of the system and the initial frequency, amplitude level, and modulation of the test signal $S_T$ 444 is generally determined based on a number of factors with one of the primary ones being that there is no interference between the test signal $S_T$ 444 and the traffic channels. These factors may result in the test signal $S_T$ 444 having a frequency that is significantly different from the reference signal $S_R$ 476, for example, 500 megahertz ("MHz") away. The frequency translator 414 allows the resulting processed test signals $[S_{T-processed}]$ 452 to be translated to a frequency that is closer to the frequency of the test signal $S_T$ 444 which allows for easier determination of the difference $[\delta_{TR}]$ between the signals since both signals may occupy a minimum amount of bandwidth. The frequency translator 414 translates the frequency of the processed test signals $[S_{T-processed}]$ 452 in a coherent fashion such that the phase relationship between the processed test signals $[S_{T-processed}]$ 452 and reference signal $S_R$ 476 may be maintained. In order to perform a frequency translation that is coherent with the coherently generated test signal $S_T$ 444 and reference signal $S_R$, the frequency translator may receive clock information from the signal generator 424.

In general, the frequency translator 414 may perform the frequency conversion utilizing analog and/or digital hardware or via software as part of a digital processor. If the frequency translator 414 utilizes a digital approach, the processed test signals $[S_{T-processed}]$ 452 may be passed through an A/D converter prior to being combined with the reference signal $S_R$ 476. If this is the case, the combiner 412 may be a digital device that combines a digitized version of both the processed test signals $[S_{T-processed}]$ 452 and reference signal $S_R$ 476. It is appreciated that by utilizing the optional frequency translator 414, the measurement of time delay through the MPA 402 is simplified because the processed test signals $[S_{T-processed}]$ 452 may be measured at multiple frequencies and the slope of the phase difference versus the frequency is proportional to the path length.

Figure 6:
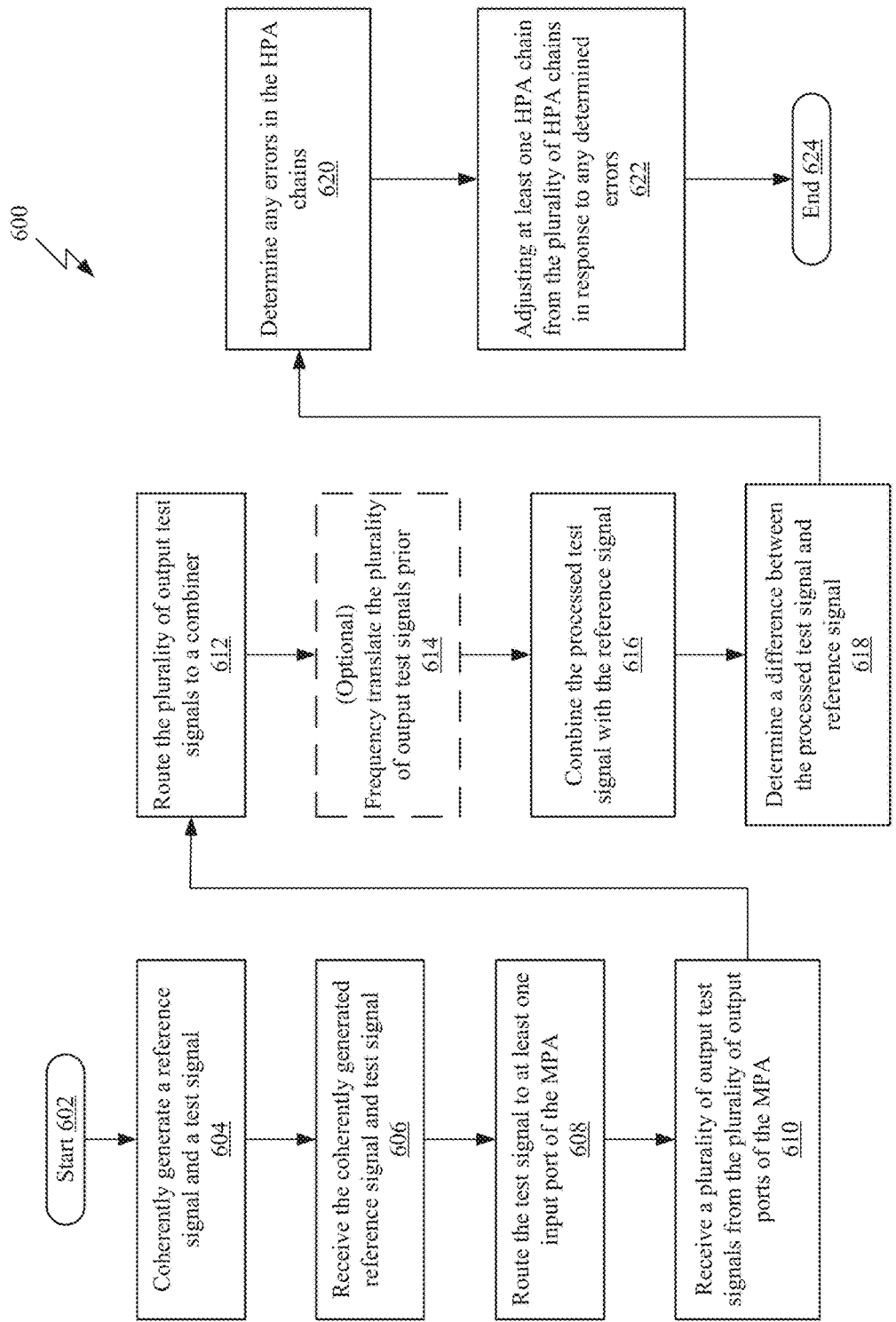
FIG. 6 is a flowchart of an example of an implementation of a process performed by the SME shown in FIGS. 4 and 5 in accordance with the present invention.

Turning to FIG. 6, a flowchart 600 of an example of an implementation of a process performed by the SME 400 is shown in accordance with the present invention. The process starts 602 by coherently generating the reference signal $S_R$ 476 and test signal $S_T$ 444 in step 604. This step may be performed by the SME 400 or by an external signal generator 424 in signal communication with the SME 400. The SME 400 then receives the coherently generated the reference signal $S_R$ 476 and test signal $S_T$ 444 in step 606. Once the SME 400 receives the test signal $S_T$ 444 it routes it (in step 608) to at least one input port of the plurality of input ports 516 of the MPA 402 with the input switch 408 and input array of couplers 404. In response, in step 610, the output array of couplers 406 receive a plurality of output test signals 583 from the plurality of output ports 518 of the MPA 402. The output switch network 410 creates a processed test signal 452 and routes it to the combiner 412 in step 612. In optional step 614, if the SME 400 includes the optional frequency translator 414, the processed test signal 452 is frequency translated to a frequency closer to the reference signal $S_R$ 476 first before being routed to the combiner 412. In step 616, the processed test signal 452 is combined with the reference signal $S_R$ 476 to produce the combined test and reference signal 472 that is passed to the controller 420. The difference between the processed test signal 452 and reference signal $S_R$ 476 are determined from the combined test and reference signal 472 in step 618. Once the difference is determined, any errors in the HPA chains 532, 534, and 536 are determined in step 620 and any necessary corrections are applied to at least one HPA chain in step 622. The process then ends 624.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A system for measuring multi-port amplifier errors of a multi-port power amplifier, wherein the multi-port power amplifier has a plurality of input ports and a plurality of output ports, the system comprising:
   a plurality of input couplers, each input coupler of the plurality of input couplers configured to couple to a corresponding input port of the multi-port power amplifier;
   a plurality of output couplers, each output coupler of the plurality of output couplers configured to couple to a corresponding output port of the multi-port power amplifier;

a signal generator configured to generate a test signal and a reference signal, wherein a first input coupler of the plurality of input couplers is configured to inject the test signal into a corresponding first input port of the multi-port power amplifier, wherein the reference signal has a first frequency, wherein the test signal has a second frequency distinct from the first frequency, wherein the plurality of input couplers is configured to inject a plurality of signals to the multi-port power amplifier, the plurality of signals including the test signal, and wherein the first frequency is distinct from a plurality of frequencies corresponding to the plurality of signals; and a combiner configured to generate a combined signal based on a summation of the reference signal and a first output signal from a first output coupler of the plurality of output couplers, wherein the combiner receives the reference signal via a signal path independent of the multi-port power amplifier.

2. The system of claim 1, wherein the combiner is configured to receive a clock signal from the signal generator, and wherein the combined signal is generated based on the clock signal.

3. The system of claim 1, wherein the signal generator, the combiner, and the multi-port power amplifier are components of a flight vehicle configured to orbit a planet.

4. The system of claim 1, further comprising an input switch network configured to route the test signal to the first input coupler at a first time, and wherein the input switch network is configured to route the test signal to a second input coupler of the plurality of input couplers at a second time, the first input coupler distinct from the second input coupler.

5. The system of claim 4, wherein the input switch network is configured to cycle the test signal through the plurality of input couplers.

6. The system of claim 1, further comprising a controller configured to determine a difference between the first output signal and the reference signal based on the combined signal.

7. The system of claim 6, wherein the controller is configured to adjust the multi-port power amplifier based on the difference.

8. The system of claim 1, further comprising an output switch network configured to route the first output signal to the combiner.

9. The system of claim 8, wherein the output switch network is configured to provide a plurality of output signals by cycling through connecting the plurality of output couplers to the combiner.

10. The system of claim 1, wherein the first output signal includes a signal portion that has the second frequency, further comprising a frequency translation module configured to generate a modified output signal by changing the signal portion to have a third frequency, wherein the combined signal is generated based on the modified output signal.

11. The system of claim 10, wherein the third frequency is a frequency between the first frequency and the second frequency.

12. The system of claim 10, wherein the frequency translation module is configured to generate the modified output signal based on a clock signal from the signal generator.

13. The system of claim 1, wherein the test signal and the reference signal have a first frequency, wherein the test signal has a first amplitude, wherein the reference signal has a second amplitude.

14. A method for adjusting a multi-port power amplifier having a plurality of high power amplifier chains, the method comprising:

generating a reference signal and a test signal at a signal generator, wherein the reference signal has a first frequency, wherein the test signal has a second frequency distinct from the first frequency;

injecting the test signal to a first input port of a plurality of input ports of the multi-port power amplifier, wherein the plurality of input couplers is configured to inject a plurality of signals to the multi-port power amplifier, the plurality of signals including the test signal, and wherein the first frequency is distinct from a plurality of frequencies corresponding to the plurality of signals; and generating, at a combiner, a combined signal based on a summation of the reference signal and a first output signal from a first output port of the multi-port power amplifier, wherein the combiner receives the reference signal via a signal path independent of the multi-port power amplifier.

15. The method of claim 14, further comprising determining a difference between the reference signal and the first output signal based on the combined signal.

16. The method of claim 15, further comprising adjusting the multi-port power amplifier based on the difference.

17. The method of claim 14, further comprising, prior to generating the reference signal, determining a vacant channel of the multi-port power amplifier.

18. The method of claim 14, further comprising generating a modified output signal by modifying a frequency of a portion of the first output signal, and wherein the combined signal is based on the modified output signal.

19. The method of claim 18, wherein the portion of the first output signal has the second frequency, and wherein the portion of the first output signal is modified to have a third frequency between the first frequency and the second frequency.

20. The method of claim 14, wherein the test signal has a first amplitude, wherein the reference signal has a second amplitude distinct from the first amplitude.

* * * * *